(12) United States Patent
Takai et al.

(10) Patent No.: US 7,495,194 B2
(45) Date of Patent: Feb. 24, 2009

(54) HEATING APPARATUS AND HEATING METHOD

(75) Inventors: Toshihiro Takai, Aichi-gun (JP); Yasuyoshi Ohashi, Aichi-gun (JP); Kazushi Hayashi, Aichi-gun (JP)

(73) Assignee: Asano Laboratories Co., Ltd., Aichi-ken (JP)

( * ) Notice: Subject to any disclaimer, the term of this patent is extended or adjusted under 35 U.S.C. 154(b) by 286 days.

(21) Appl. No.: 11/558,507

(22) Filed: Nov. 10, 2006

(65) Prior Publication Data
US 2008/0083735 A1    Apr. 10, 2008

(30) Foreign Application Priority Data
Aug. 28, 2006    (JP)    ............................ P2006-230693

(51) Int. Cl.
*H05B 3/02*    (2006.01)
*H01C 7/10*    (2006.01)

(52) U.S. Cl. ........................ 219/483; 219/484; 219/485; 219/486; 219/501; 219/506; 219/481; 219/517; 219/494; 219/497; 307/29; 307/48; 338/22 R

(58) Field of Classification Search ......... 219/483–486, 219/501, 506, 481, 517, 494, 497; 307/29, 307/48; 338/22 R, 22 SD
See application file for complete search history.

(56) References Cited

FOREIGN PATENT DOCUMENTS

JP    2003-181912    7/2003

*Primary Examiner*—Shawntina Fuqua
(74) *Attorney, Agent, or Firm*—Wood, Herron & Evans, LLP

(57) ABSTRACT

A heating apparatus includes a plurality of heating means that heat a heated object, a temperature measuring means that measures temperatures of some of the plurality of heating means, a heated object information storing means that stores, in a coordinate manner, heated object identification names, target heating temperatures at the heating means, and sets of heating ratios respectively assigned to the heating means, a heating information storage means that defines a relationship between temperatures during heating of the heating means up to the target heating temperatures and heating intensities at the temperatures, a heated object identification name obtaining means that obtains one of the heated object identification names, a heated object information reading-out means that reads out one of the target heating temperatures and one of the sets of heating ratios respectively assigned to the plurality of heating means, corresponding to the heated object identification name from the heated object information storage means, a heating information reading-out means that reads out one of the heating intensities corresponding to the temperature measured by the temperature measuring means from the heating information storage means, and a heat control means that controls each of the plurality of heating means so that the target heating temperature is achieved.

5 Claims, 6 Drawing Sheets

| HEATED OBJECT IDENTIFICATION NAME | TARGET HEATING TEMPERATURE (°C) | SET OF HEATING RATIOS |
|---|---|---|
| N1 | T1 | P1 |
| N2 | T2 | P2 |
| N3 | T3 | P3 |
|  |  |  |

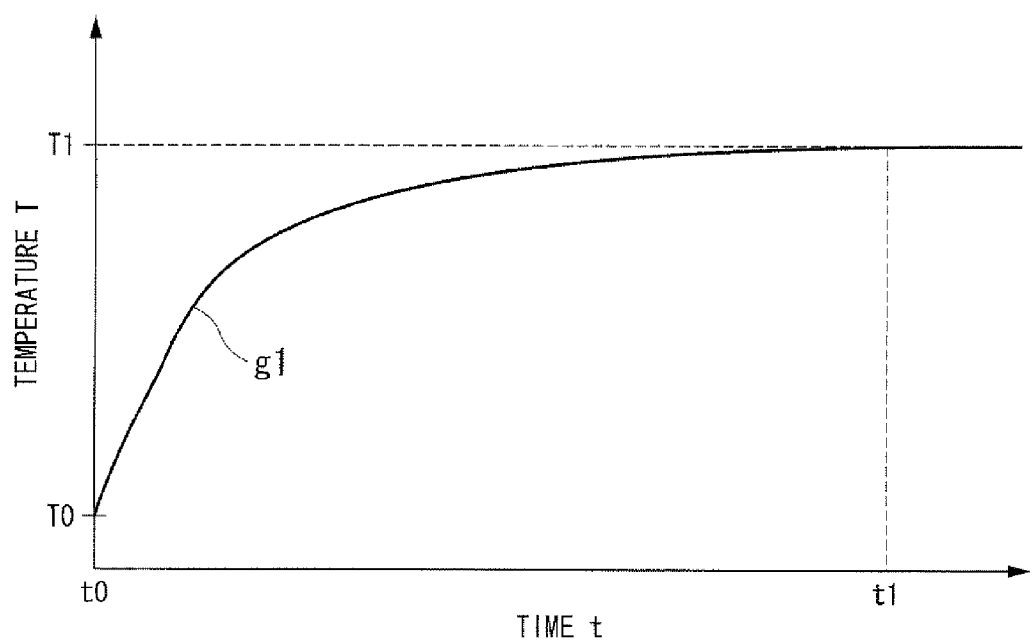

| HEATING INTENSITY × HEATING RATIO (%) | POWER SUPPLY STARTING TIME (ms) |
|---|---|
| 0 | L1 |
| ... | ... |
| 50 | L1/2 |
| ... | ... |
| 100 | 0 |

HEATING APPARATUS AND HEATING METHOD

BACKGROUND OF THE INVENTION

1. Field of the Invention

The present invention relates to a heating apparatus and a heating method, and in particular, relates to a heating apparatus and a heating method that are used for shaping a heated object such as a resin sheet or the like.

Priority is claimed on Japanese Patent Application No. 2006-230693, filed Aug. 28, 2006, the content of which is incorporated herein by reference.

2. Description of Related Art

Conventionally, for shaping a resin sheet or the like which is a heated object, a heating apparatus has been known in which heaters that are arranged on a plane in a lattice pattern are employed. When processing a resin sheet, in order to largely deform specific regions of the resin sheet and not to deform other regions, it has been necessary to measure the temperature of each region of the resin sheet and to control the temperature of each heater (refer to, for example, Japanese Unexamined Patent Application, First Publication No. 2003-181912).

However, in conventional technologies, because it is necessary to measure the temperatures of a plurality of regions of the resin sheet, and to control the temperatures of the heaters based on the measured results, it is necessary to provide a plurality of elements for measuring temperature (thermocouple or the like), which leads to a problem in that the cost for manufacturing the heating apparatus increases.

Moreover, because it is necessary to control the temperature of each of the plurality of heaters based on the measured temperatures, a problem is encountered in that a complicated control is required when carrying out a heating operation using the plurality of heaters.

SUMMARY OF THE INVENTION

The present invention was made to solve the aforementioned problems, and provides a heating apparatus including: a plurality of heating means that heat a heated object; a temperature measuring means that measures temperatures of some of the plurality of heating means; a heated object information storing means that stores, in a coordinate manner, heated object identification names, target heating temperatures at the heating means whose temperatures are measured by the temperature measuring means, and sets of heating ratios respectively assigned to the heating means; a heating information storage means that defines a relationship between temperatures during heating of the heating means, whose temperatures are measured by the temperature measuring means, up to the target heating temperatures, and heating intensities at the temperatures; a heated object identification name obtaining means that obtains one of the heated object identification names corresponding to the heated object to be heated by the plurality of heating means; a heated object information reading-out means that reads out one of the target heating temperatures and one of the sets of heating ratios respectively assigned to the plurality of heating means, corresponding to the heated object identification name obtained by the heated object identification name obtaining means, from the heated object information storage means; a heating information reading-out means that reads out one of the heating intensities corresponding to the temperature measured by the temperature measuring means from the heating information storage means, and a heat control means that controls each of the plurality of heating means based on the heating intensity read out by the heating information reading-out means and the set of heating ratios respectively assigned to the plurality of heating means read out by the heating information reading-out means, so that the temperature measured by the temperature measuring means reaches the target heating temperature read out by the heated object information reading-out means.

In the present invention, the heated object is heated up to the target temperature at the heating intensity corresponding to the temperatures of some of the heating means whose temperatures are measured by the temperature measuring means while maintaining the set of heating ratios respectively assigned to the heating means. According to the above constitution, the heated object can be heated while maintaining the balance of the heating ratios of the heating means by measuring temperature at only some of the plurality of heating means.

The above heating apparatus may further include a heated object information obtaining means that obtains the heated object identification names, the target heating temperatures at the heating means whose temperatures are measured by the temperature measuring means, and the sets of heating ratios respectively assigned to the heating means, and the heated object information storage means may store, in a coordinate manner the heated object identification names, the target heating temperatures, and the sets of heating ratios, obtained by the heated object information obtaining means.

In the present invention, the heated object identification names, the target heating temperatures, and the sets of heating ratios are obtained by the heated object information obtaining means, and the information is stored in the heated object information storage means. According to the above constitution, the administrator of the heating apparatus can set the target heating temperature and the set of heating ratios depending on the heated object, and thus an optimal heating and shaping operation can be performed depending on the heated object.

In the above heating apparatus, the heating information storage means may define, as the relationship between temperatures during heating of the heating means, whose temperatures are measured by the temperature measuring means, up to the target heating temperatures, and the heating intensities at the temperature, a relationship between the temperatures and the heating intensities such that the heating intensity is set smaller as the temperature getting higher.

According to the above constitution, because it is possible to make the heating intensity to be small as the temperature increases when the heating means is heated up to the target heating temperature, breakage or the like of the heated object due to a rapid heating can be prevented.

In the above heating apparatus, the heating control means may supply AC power to and heats each of the heating means in such a manner that a product of the heating intensity that is read out by the heating information reading-out means and the heating ratio of each of the heating means that is read out by the heated object information reading-out means is proportional to a waveform area of the AC power that is supplied to each of the heating means.

In the present invention, because AC power is supplied to each of the heating means such that a product of the heating intensity and the heating ratio is proportional to a waveform area of the AC power that is supplied to each of the heating means, it is possible to alternate the AC power in a short period so that the waveform area becomes a predetermined area size, and thus it is possible to prevent the temperature of the heating means from becoming excessively high or low.

Moreover, the present invention provides a heating method including: a first step of measuring temperatures of some of a plurality of heating means by a temperature measuring means; a second step of storing, in a coordinate manner, heated object identification names of heated objects to be heated by the plurality of heating means, target heating temperatures at the heating means whose temperatures are measured by the temperature measuring means, and sets of heating ratios respectively assigned to the heating means; a third step of defining, by a heating information storage means, a relationship between temperatures during heating of the heating means, whose temperatures are measured by the temperature measuring means, up to the target heating temperatures, and heating intensities at the temperatures; a fourth step of obtaining, by a heated object identification name obtaining means, one of the heated object identification names corresponding to the heated object to be heated by the plurality of heating means; a fifth step of reading out, by a heated object information reading-out means, one of the target heating temperatures and one of the sets of heating ratios respectively assigned to the plurality of heating means, corresponding to the heated object identification name obtained by the heated object identification name obtaining means, from the heated object information storage means; a sixth step of reading out, by a heating information reading-out means, one of the heating intensities corresponding to the temperature measured by the temperature measuring means from the heating information storage means; and a seventh step of controlling, by a heat control means, each of the plurality of heating means based on the heating intensity read out by the heating information reading-out means and the set of heating ratios respectively assigned to the plurality of heating means read out by the heating information reading-out means, so that the temperature measured by the temperature measuring means reaches the target heating temperature read out by the heated object information reading-out means.

As explained above, according to the present invention, the heated object can be heated while maintaining the balance of the heating ratios of the heating means by measuring temperature at only some of the plurality of heating means.

BRIEF DESCRIPTION OF THE DRAWINGS

FIG. 6 is a diagram showing an example of information stored in the heating information storage unit according to the embodiment of the present invention.

FIG. 7 is a diagram showing an example of heating information stored in the heating information storage unit according to the embodiment of the present invention.

DETAILED DESCRIPTION OF THE INVENTION

An embodiment of the present invention will be explained below with reference to the drawings.

Figure 1:
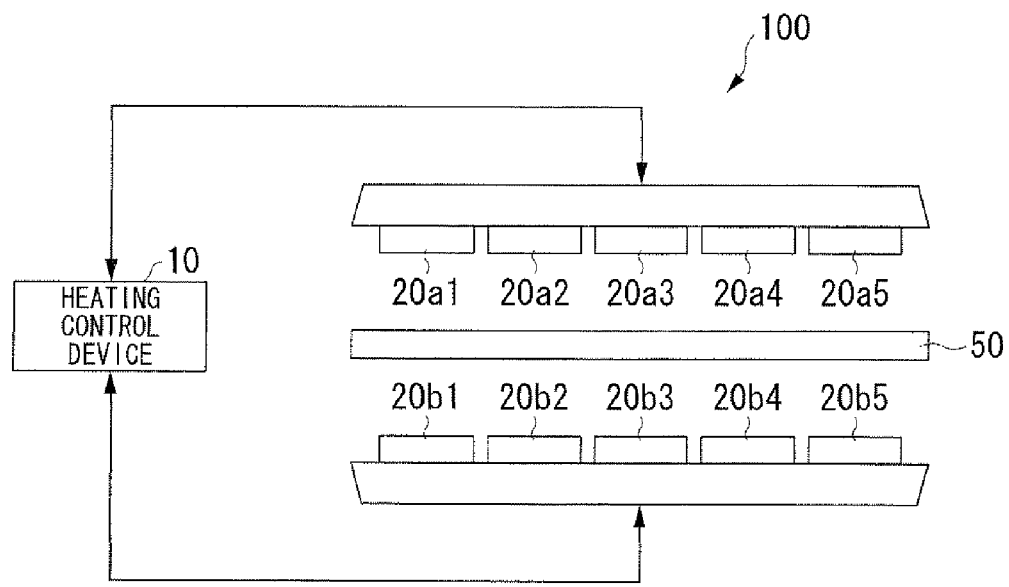
FIG. 1 is a schematic diagram showing the constitution of a heating apparatus according to an embodiment of the present invention.

FIG. 1 is a schematic diagram showing the constitution of a heating apparatus 100 according to an embodiment of the present invention. The heating apparatus 100 includes a heating control device 10, heating units $20a1$ to $20a25$, and heating units $20b1$ to $20b25$. In FIG. 1, because the side views of the heating units $20a1$ to $20a25$ and heating units $20b1$ to $20b25$ are shown, the heating units $20a1$ to $20a5$ and heating units $20b1$ to $20b5$ are only shown.

Figure 2:
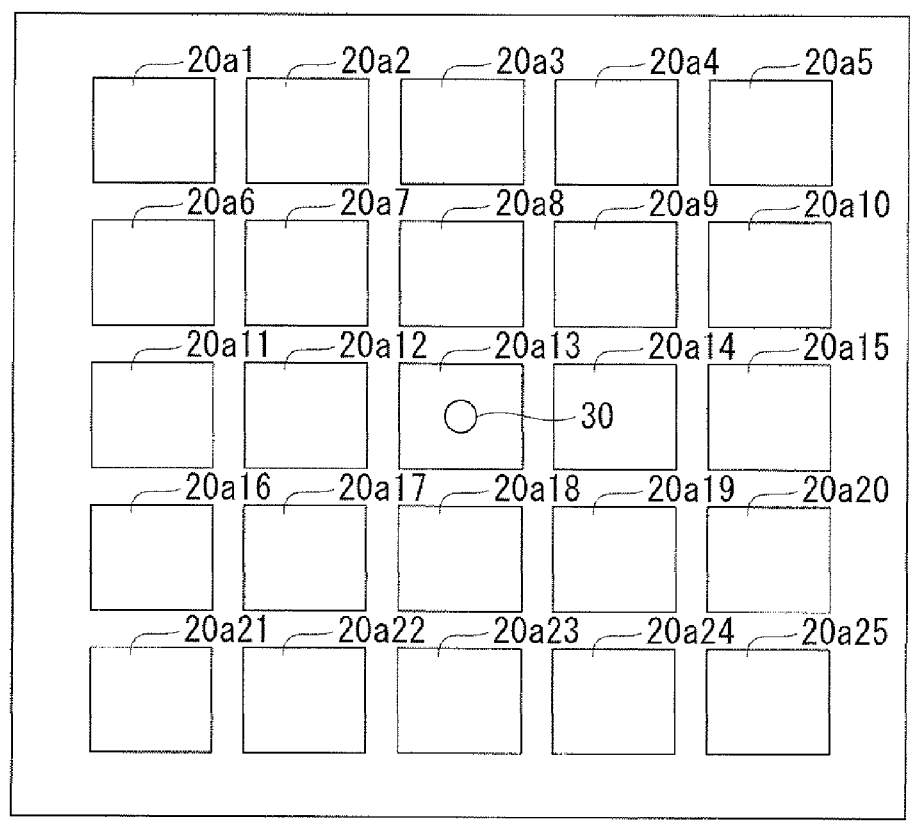
FIG. 2 is a plan view showing the constitution of a heating unit according to the embodiment of the present invention.

FIG. 2 is a plan view showing the constitution of the heating units $20a1$ to $20a25$ according to the embodiment of the present invention. Because the constitutions of the heating units $20b1$ to $20b25$ are identical to that of the heating units $20a1$ to $20a25$, the description thereof is omitted.

The heating units $20a1$ to $20a25$ are arranged on a plane in a lattice pattern of 5 by 5. Each of the heating units (a plurality of heating means) includes a heater, and carrying out heating of a heated object 50. In each heating unit of the heating units $20a1$ to $20a25$, heating temperature is controlled in accordance with the control operation of the heating control device 10.

The heating unit $20a13$ is provided with a temperature measuring unit 30 (temperature measuring means). The temperature measuring unit 30 is an element for measuring temperature such as a thermister, a thermocouple, or the like, measures temperatures of some of the heating units $20b1$ to $20b25$ (one heating unit may be sufficient, and the heating unit $20a13$ is herein selected), and sends the measured temperatures to the heating control device 10.

Returning to FIG. 1, the heating control device 10 controls each heater of the heating units $20a1$ to $20a25$ and the heating units $20b1$ to $20b25$. The specific constitution of the heating control device 10 will be explained below with reference to FIG. 3.

The heating units $20a1$ to $20a25$ heat the heated object 50 from the top thereof, and the heating units $20b1$ to $20b25$ heat the heated object 50 from the bottom thereof. The heated object 50 is a resin sheet or the like, is softened by being heated, and is shaped in a predetermined shape by a shaping device (not shown).

Figure 3:
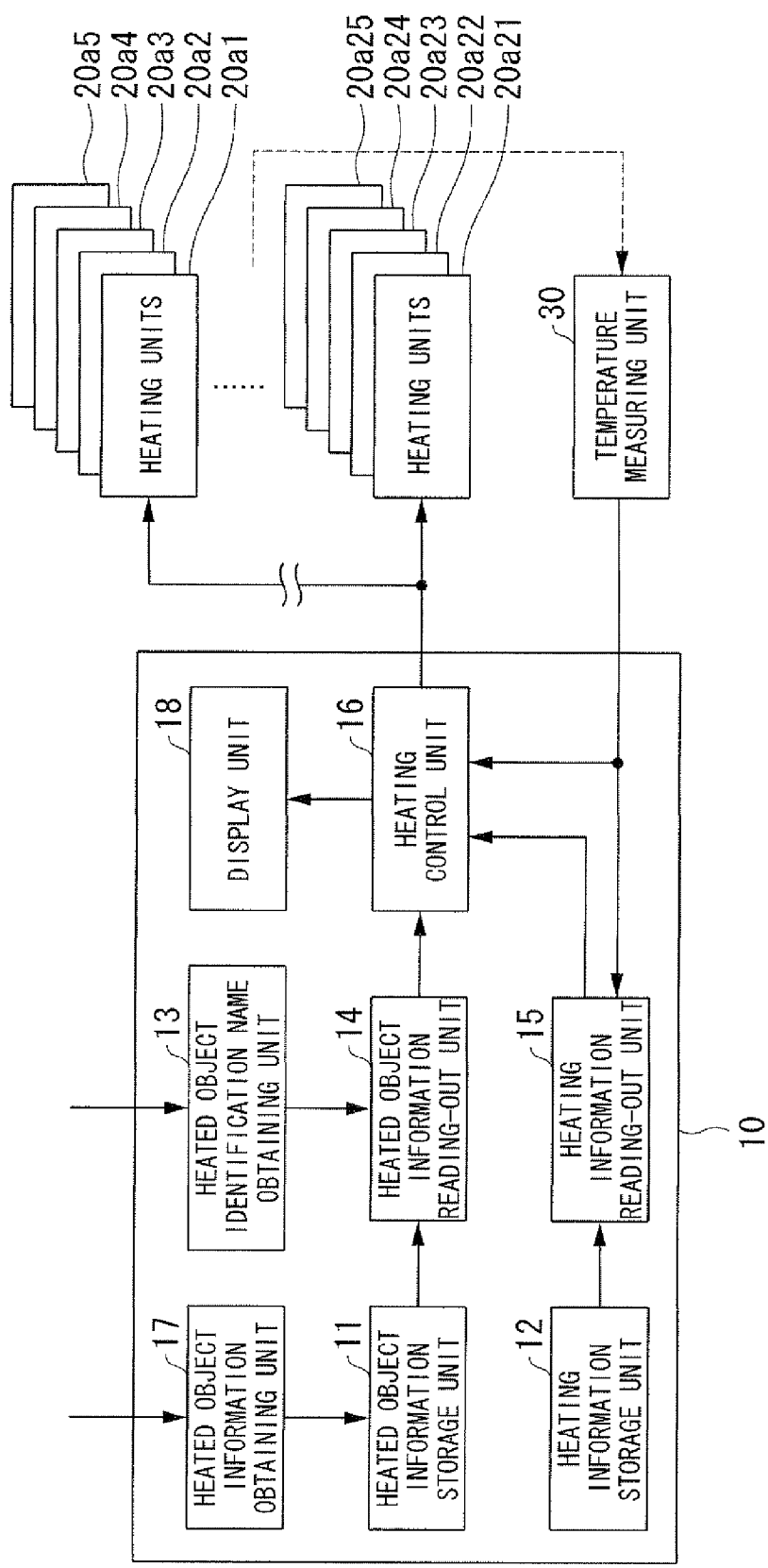
FIG. 3 is a block diagram showing the constitution of the heating apparatus according to the embodiment of the present invention.

FIG. 3 is a block diagram showing the constitution of the heating apparatus 100 according to the embodiment of the present invention. The heating apparatus 100 includes the heating control device 10, the heating units $20a1$ to $20a25$, and the temperature measuring unit 30. Because the constitutions and control operations of the heating units $20b1$ to $20b25$ are identical to those of the heating units $20a1$ to $20a25$, illustration and explanation thereof are omitted.

The heating apparatus 100 includes a heated object information storage unit 11 (a heated object information storage means), a heating information storage unit 12 (a heating information storage means), a heated object identification name obtaining unit 13 (a heated object identification name obtaining means), a heated object information reading-out unit 14 (a heated object information reading-out means), a heating information reading-out unit 15 (a heating information reading-out means), a heating control unit 16 (a heating control means), a heated object information obtaining unit 17 (a heated object information obtaining means): and a display unit 18.

Figures 4, 5:
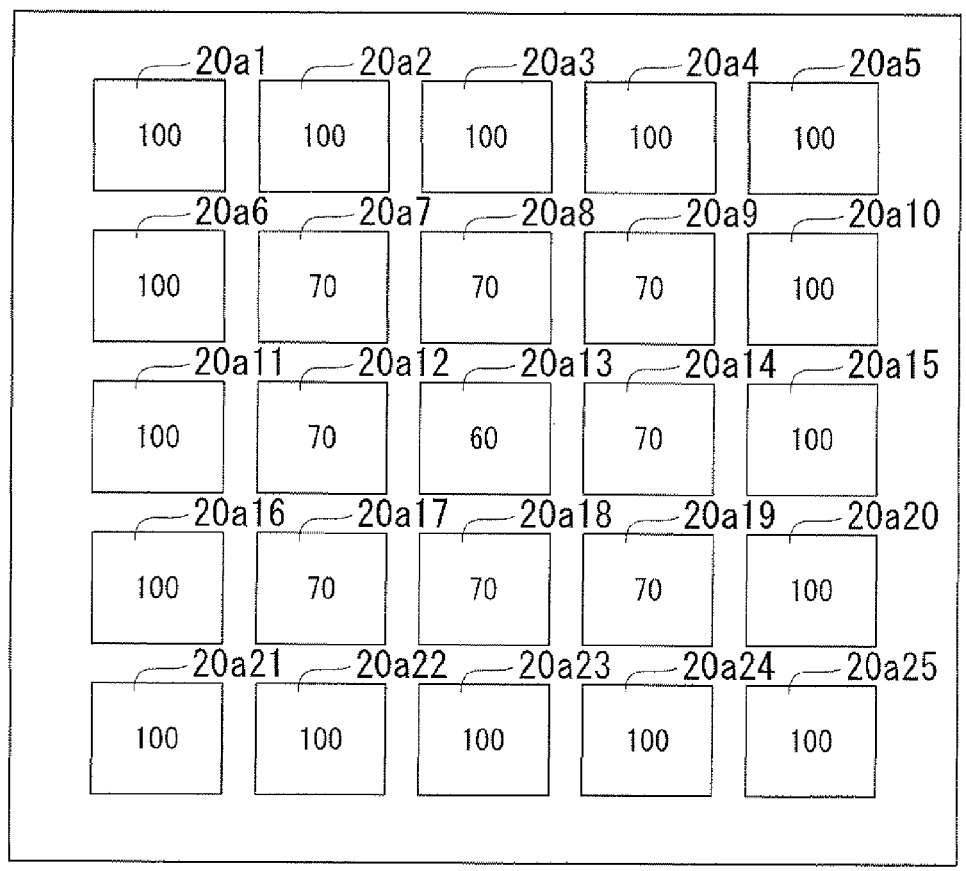
FIG. 4 is a diagram showing an example of heated object information stored in a heated object information storage unit according to the embodiment of the present invention.
FIG. 5 is a diagram showing an example of heating ratios stored in the heated object information storage unit according to the embodiment of the present invention.

FIG. 4 is a diagram showing an example of heated object information stored in the heated object information storage unit according to the embodiment of the present invention. The heated object information storage unit 11 stores, in a coordinate manner, heated object identification names (identification names that indicate the types of the heated object, e.g., N1) which are set by the heated object information obtaining unit 17, target heating temperatures (e.g., T1) which are set for the heating unit(s) 20 whose temperature is measured by the temperature measuring unit 30, and sets of heating ratios (e.g. P1), the heating ratios being respectively assigned to the heating units 20a1 to 20a25, as the heated object information. As the target heating temperature, a temperature at which the heated object 50 is soften is used.

FIG. 5 is a diagram showing an example of a set of heating ratio P1. stored in the heated object information storage unit 11 according to the embodiment of the present invention. The heating ratio is information indicating what ratios are respectively maintained for the heating units 20a1 to 20a25 during heating. FIG. 5 shows a case in which the heating ratio of the heating unit 20a13 is set to 60 (%), the heating ratios of the heating units 20a1 to 20a5, 20a6, 20a10, 20a1, 20a15, 20a16, 20a20, and 20a21 to 20a25 are set to 100 (%), and the heating ratios of the heating units 20a7 to 20a9, 20a12, 20a14, and 20a17 to 20a19 are set to 70 (%).

As a result, the heating units 20a1 to 20a25 can be heated to the target temperature T1 while maintaining the set of heating ratios P1 shown in FIG. 5.

FIG. 6 is a diagram showing an example of information stored in the heating information storage unit 12 according to the embodiment of the present invention. In FIG. 6, the horizontal axis indicates time t (s), and the vertical axis indicates temperature T (° C.). FIG. 6 shows a case in which the heating unit 20a13 is heated from a temperature of T0 at time t0 to a temperature of T1 at time t1. The heating information storage unit 12 stores the heating information shown in FIG. 7 which defines the relationship between time t and temperature T in accordance with the curved line g1 shown in FIG. 6.

FIG. 7 is a diagram showing an example of heating information stored in the heated object information storage unit according to the embodiment of the present invention. The heating information storage unit 12 stores, as the heating information, the relationship between temperatures during heating of the heating unit 20, whose temperature is measured by the temperature measuring unit 30, up to the target heating temperature, and heating intensities at the temperatures. The heating intensity is information indicating how strong the heating units 20a1 to 20a25 are heated. For example, when assuming that each of the heating units can be supplied with an electrical power of W and the heating intensity is set to 50 (%), the heating units respectively having a heating ratio of 100 (%), 70 (%), and 50 (%) are heated with an electrical power of 50 (%) of W (=50 (%)×100 (%)), an electrical power of 35 (%) of W (=50 (%)×70 (%)), and an electrical power of 30 (%) of W (=50 (%)×60 (%)), respectively.

In FIG. 7, the heating intensity is set such that the heating intensity is 100 (%) at a temperature of T0 (° C.) and the heating intensity is 50 (%) at a temperature of T1 (° C.) (where T0<T1). In other words, the heating information storage unit 12 stores, as the relationship between temperatures during heating of the heating unit 20, whose temperature is measured by the temperature measuring unit 30, up to the target heating temperature T1, and heating intensities at the temperature, the relationship between the temperatures and the heating intensities such that the heating intensity is set smaller as the temperature getting higher. As a result, because the heating intensity can be set smaller as the temperature getting higher during heating of the heating unit 20a13 up to the target heating temperature, breakage or the like of the heated object 50 due to rapid heating can be prevented.

Returning to FIG. 3, the heated object identification name obtaining unit 13 is an input device, and obtains the identification name of the heated object to be heated by the heating units 20a1 to 20a25 through the operation by an administrator or the like of the heating apparatus 100.

The heated object information reading-out unit 14 reads out one of the target heating temperatures and one of the sets of the heating ratios respectively assigned to the heating units 20 (refer to FIG. 5), corresponding to the heated object identification name obtained by the heated object identification name obtaining unit 13, from the heated object information storage unit 11.

The heating information reading-out unit 15 reads out the heating intensity corresponding to the temperature measured by the temperature measuring unit 30 from the heating information storage unit 12.

The heating control unit 16 controls and heats each of the heating units 20 so that the temperature measured by the temperature measuring unit 30 reaches the target heating temperature read out by the heated object information reading-out unit 14 based on the heating intensity read out by the heating information reading-out unit 15 and the set of heating ratios respectively assigned to the heating units 20 read out by the heated object information reading-out unit 14.

Figures 8, 9:
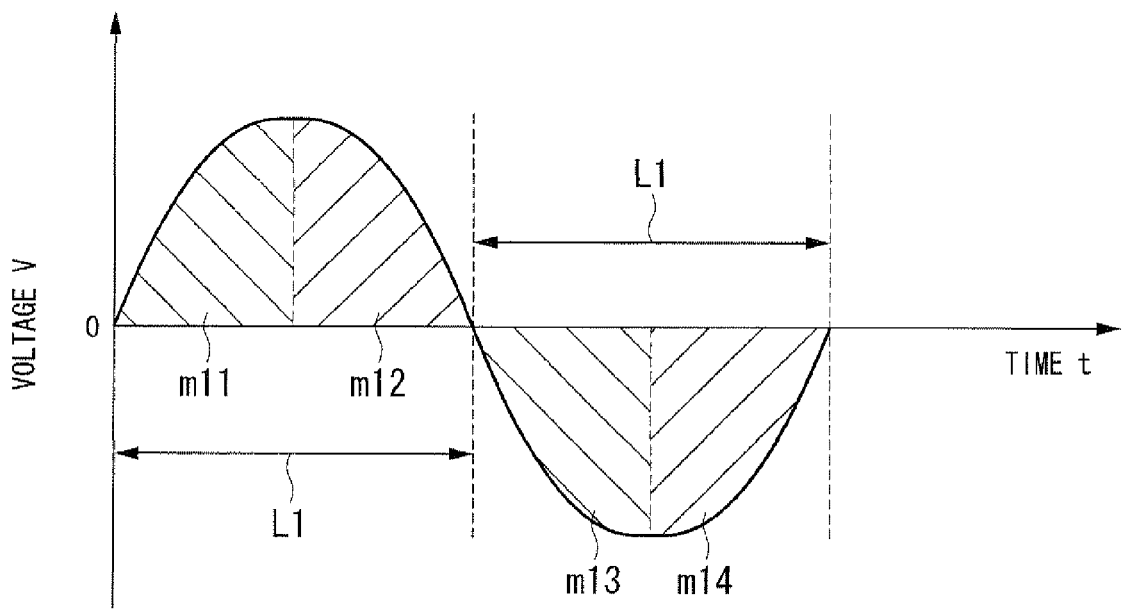
FIG. 8 is a diagram showing the waveform of AC power supplied to the heating unit according to the embodiment of the present invention.
FIG. 9 is a diagram showing an example of information stored in a heating control unit according to the embodiment of the present invention.

FIG. 8 is a diagram showing the waveform of AC power supplied to the heating units 20a1 to 20a25. In FIG. 5, the horizontal axis indicates time (ms), and the vertical axis indicates voltage (V). One wavelength of alternating current is twice the time L1. L1 indicates, for example, 10 (ms).

As shown in FIG. 9, the heating control unit 16 stores, in a coordinate manner, a product of the heating intensity (e.g., 100 (%)) and the heating ratio (eg., 50 (%)), and power supply starting time (e.g., L½ (ms)). The heating control unit 16 starts supplying of AC power to the heating units 20a1 to 20a25 when the power supply starting time is passed after voltage becomes zero. After that, when voltage becomes zero, the heating control unit 16 stops supplying of AC power to the heating units 20a1 to 20a25. Thereafter, the same operation is repeated for every time the time L1 elapses.

For example, when the product of the heating intensity and the heating ratio is 50 (%), and the power supply starting time is L½ (ms), the heating control unit 16 supplies AC power equivalent to 50 (%) of the total waveform area (i.e., m11+m12+m13+m14) to the heating units 20a1 to 20a25. More specifically, the heating control unit. 16 supplies AC power equivalent to an area of 50 (%) (i.e., m12+m14) of the total waveform area to the heating units. In other words, the heating control unit 16 supplies AC power to and heats each of the heating units 20 in such a manner that the product of the heating intensity that is read out by the heating information reading-out unit 15 and the heating ratio of each of the heating units 20 that is read out by the heated object information reading-out unit 14 is proportional to the waveform area of the AC power that is supplied to each of the heating units.

Returning to FIG, 3, the heated object information obtaining unit 17 is an input device, and obtains the heated object identification name, the target heating temperature at the heating unit(s) 20 whose temperature is measured by the temperature measuring unit 30, and the heating ratio of each of the heating units through the operation by an administrator or the like of the heating apparatus 100.

The display unit 18 is a display device such as an LCD (Liquid Crystal Display), and displays information of the set of heating ratios P1 shown in FIG. 5. The administrator or the like of the heating apparatus 100 inputs the heating ratio of each of the heating units through the heated object information obtaining unit 17 with reference to the information of the set of heating ratios P1 displayed on the display unit 18.

Figure 10:
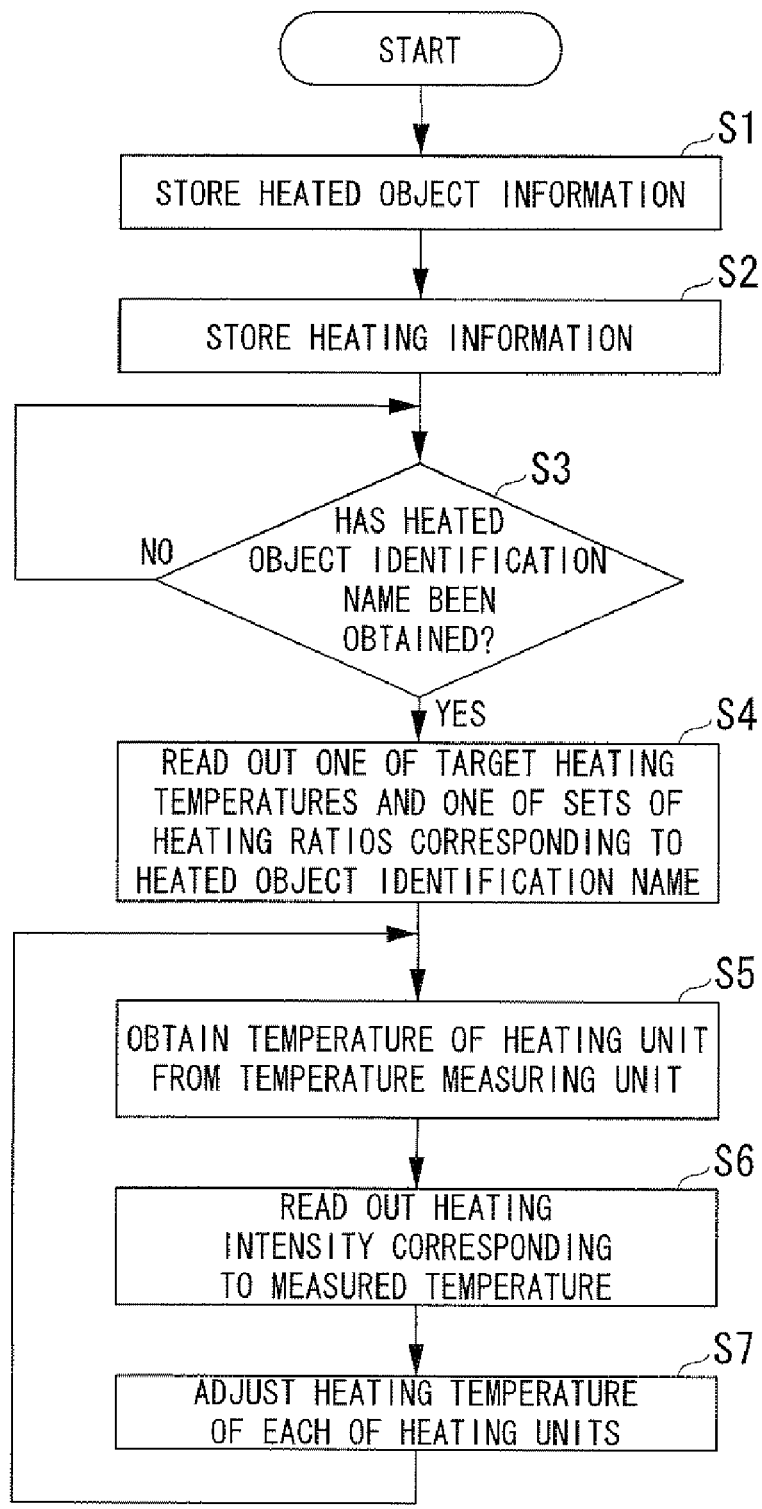
FIG. 10 is a flowchart showing the processing carried out by a heating control device according to the embodiment of the present invention.

FIG. 10 is a flowchart showing the processing carried out by the heating control device 10 according to the embodiment of the present invention. First, the heated object information storage unit 11 stores, in a coordinate manner, the heated object identification names (e.g., N1), the target heating temperatures (e.g., T1) which are set for the heating unit 20a13 whose temperature is measured by the temperature measuring unit 30, and the sets of heating ratios (e.g., P1), the heating ratios being respectively assigned to the heating units, as the heated object information (step S1). The heated object information is input through the heated object information obtaining unit 17 by the operation of an administrator or the like of the heating apparatus 100.

Moreover, the heating information storage unit 12 stores, as the heating information, the relationship between the temperature T during heating of the heating unit 20a13, whose temperature is measured by the temperature measuring unit 30, up to the target heating temperature (e.g., T1), and the heating intensity at the temperature T (step S2). The heating information is stored in the heating information storage unit 12 beforehand through the operation of an administrator or the like of the heating apparatus 100.

The heated object information reading-out unit 14 determines whether the heated object identification name obtaining unit 13 has obtained one of the heated object identification names (step S3). When the heated object identification name obtaining unit 13 has not obtained one of the heated object identification names ("NO" in step S3), the process returns to step S3. On the other hand, the heated object identification name obtaining unit 13 has obtained one of the heated object identification names (e.g., N1) ("YES" in step S3), the heated object information reading-out unit 14 reads out one of the target heating temperatures (e.g., T1) corresponding to the heated object identification name (e g, N1) obtained in step S3 and one of the sets of heating ratios respectively assigned to the heating units 20a1 to 20a25 (e.g., P1 (refer to FIG. 5)) from the heated object information storage unit 11 (step S4).

Then, the heating information reading-out unit 15 obtains the temperature (e.g., T0) of the heating unit 20 from the temperature measuring unit 30 (step S5).

The heating information reading-out unit 15 reads out the heating intensity (e.g., 100 (%)) corresponding to the temperature (e.g., T0) measured in step S5 from the heating information storage unit 12 (step S6).

The heating control unit 16 adjusts the heating temperature of each of the heating units (step 87). More specifically, the heating control unit 16 controls and heats each of the heating units 20 in such a manner that the product of the heating intensity (e.g., 100 (%)) that is read out by the heating information reading-out unit 15 and the heating ratio (e.g., 50 (%)) of each of the heating units 20 that is read out by the heated object information reading-out unit 14 is proportional to the ratio of the area of AC power (e.g., m12, m14, . . . ) that is supplied to each of the heating units with respect to the total waveform area (m1, m2, m3, m4, . . . ), so that the temperature measured by the temperature measuring unit 30 reaches the target heating temperature (e.g., T1) that is read out by the heated object information reading-out unit 14. Then, the process proceeds to step S5.

In the heating apparatus 100 according to the embodiment of the present invention, the heating operation is carried out at the heating intensity corresponding to the temperature T measured by the temperature measuring unit 30 up to the target heating temperature (e.g., T1) while maintaining the set of heating ratios (e.g., P1) respectively assigned to the heating units 20. As a result, the heated object 50 can be heated while maintaining the balance of the heating ratios of the heating units by measuring temperature T at only some of the plurality of heating units (one heating unit may be sufficient, e.g., the heating unit 20a13).

In the embodiment explained above, the control operation of the heating apparatus 100 may be carried out by recording in a computer-readable recording medium a program for achieving the functions or some of the functions of the heated object information storage unit 11, the heating information storage unit 12, the heated object identification name obtaining unit 13, the heated object information reading-out unit 14, the heating information reading-out unit 15, the heating control unit 16, the heated object information obtaining unit 17, and the display unit 18, shown in FIG. 3, by inputting the program stored in the recording medium into a computer system, and by executing the program. It should be noted that the "computer system" herein referred to includes an operation system and hardware such as peripheral devices.

Moreover, the "computer-readable recording medium" indicates portable media such as a flexible disc, a magneto-optical disc, a ROM, and a CD-ROM, and a memory such as a hard disc that is built in a computer system. Furthermore, the "computer-readable recording medium" also includes a medium for dynamically storing a program for a short period such as communication wirings used for sending a program through communication lines such as telephone lines or the like or through a network such as the internet or the like, and a medium for storing a program for a specific period such as a volatile memory housed in a computer system that functions as a server or client in the case of the aforementioned communications. In addition, the aforementioned program may be a program for achieving a portion of the aforementioned function, and may be a program for achieving the aforementioned function by being combined with programs that have been stored in the computer system.

While preferred embodiment of the invention have been described above with reference to the drawings, it should be understood that concrete constitutions are not limited to the embodiment, and design modifications without departing from the scope of the present invention may be included.

What is claimed is:

1. A heating apparatus comprising:
a plurality of heating means that heat a heated object;
a temperature measuring means that measures temperatures of some of the plurality of heating means;
a heated object information storing means that stores, in a coordinate manner, heated object identification names, target heating temperatures at the heating means whose temperatures are measured by the temperature measuring means, and sets of heating ratios respectively assigned to the heating means;
a heating information storage means that defines a relationship between temperatures during heating of the heating means, whose temperatures are measured by the temperature measuring means, up to the target heating temperatures, and heating intensities at the temperatures;
a heated object identification name obtaining means that obtains one of the heated object identification names corresponding to the heated object to be heated by the plurality of heating means;

a heated object information reading-out means that reads out one of the target heating temperatures and one of the sets of heating ratios respectively assigned to the plurality of heating means, corresponding to the heated object identification name obtained by the heated object identification name obtaining means, from the heated object information storage means;

a heating information reading-out means that reads out one of the heating intensities corresponding to the temperature measured by the temperature measuring means from the heating information storage means; and a heat control means that controls each of the plurality of heating means based on the heating intensity read out by the heating information reading-out means and the set of heating ratios respectively assigned to the plurality of heating means read out by the heating information reading-out means, so that the temperature measured by the temperature measuring means reaches the target heating temperature read out by the heated object information reading-out means.

2. The heating apparatus according to claim 1, further comprising a heated object information obtaining means that obtains the heated object identification names, the target heating temperatures at the heating means whose temperatures are measured by the temperature measuring means, and the sets of heating ratios respectively assigned to the heating means, wherein the heated object information storage means stores, in a coordinate manner, the heated object identification names, the target heating temperatures, and the sets of heating ratios, obtained by the heated object information obtaining means.

3. The heating apparatus according to claim 1, wherein the heating information storage means defines, as the relationship between temperatures during heating of the heating means, whose temperatures are measured by the temperature measuring means, up to the target heating temperatures, and the heating intensities at the temperature, a relationship between the temperatures and the heating intensities such that the heating intensity is set smaller as the temperature getting higher.

4. The heating apparatus according to claim 1, wherein the heating control means supplies AC power to and heats each of the heating means in such a manner that a product of the heating intensity that is read out by the heating information reading-out means and the heating ratio of each of the heating means that is read out by the heated object information reading-out means is proportional to a waveform area of the AC power that is supplied to each of the heating means.

5. A heating method comprising.

a first step of measuring temperatures of some of a plurality of heating means by a temperature measuring means;

a second step of storing, in a coordinate manner, heated object identification names of heated objects to be heated by the plurality of heating means, target heating temperatures at the heating means whose temperatures are measured by the temperature measuring means, and sets of heating ratios respectively assigned to the heating means;

a third step of defining, by a heating information storage means a relationship between temperatures during heating of the heating means, whose temperatures are measured by the temperature measuring means, up to the target heating temperatures, and heating intensities at the temperatures;

a fourth step of obtaining, by a heated object identification name obtaining means, one of the heated object identification names corresponding to the heated object to be heated by the plurality of heating means;

a fifth step of reading out, by a heated object information reading-out means, one of the target heating temperatures and one of the sets of heating ratios respectively assigned to the plurality of heating means, corresponding to the heated object identification name obtained by the heated object identification name obtaining means, from the heated object information storage means;

a sixth step of reading out, by a heating information reading-out means, one of the heating intensities corresponding to the temperature measured by the temperature measuring means from the heating information storage means; and a seventh step of controlling, by a heat control means, each of the plurality of heating means based on the heating intensity read out by the heating information reading-out means and the set of heating ratios respectively assigned to the plurality of heating means read out by the heating information reading-out means, so that the temperature measured by the temperature measuring means reaches the target heating temperature read out by the heated object information reading-out means.

* * * * *